US011250005B2

(12) United States Patent
Li et al.

(10) Patent No.: US 11,250,005 B2
(45) Date of Patent: *Feb. 15, 2022

(54) DISTRIBUTED METADATA-BASED CLUSTER COMPUTING

(71) Applicant: Snowflake Inc., Bozeman, MT (US)

(72) Inventors: Bing Li, Foster City, CA (US); Edward Ma, San Jose, CA (US); Mingli Rui, San Ramon, CA (US); Haowei Yu, Newark, CA (US); Andong Zhan, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/905,729

(22) Filed: Jun. 18, 2020

(65) Prior Publication Data

US 2021/0191945 A1    Jun. 24, 2021

Related U.S. Application Data

(63) Continuation of application No. 16/719,218, filed on Dec. 18, 2019, now Pat. No. 10,719,517.

(51) Int. Cl.
*G06F 17/30* (2006.01)
*G06F 16/2455* (2019.01)
*G06F 16/25* (2019.01)
*G06F 21/62* (2013.01)
*G06F 16/28* (2019.01)
(Continued)

(52) U.S. Cl.
CPC ...... *G06F 16/24561* (2019.01); *G06F 16/258* (2019.01); *G06F 16/27* (2019.01); *G06F 16/28* (2019.01); *G06F 21/62* (2013.01); *H04L 63/0281* (2013.01)

(58) Field of Classification Search
CPC .... G06F 16/27; G06F 16/28; G06F 16/24561; G06F 16/13; G06F 16/24; G06F 16/156; G06N 3/00; G06N 5/00; G05B 13/00
See application file for complete search history.

(56) References Cited

U.S. PATENT DOCUMENTS 8,484,259 B1 *  7/2013  Makkar ............ G06F 16/90335
                                                        707/827
8,812,752 B1    8/2014  Shih et al.
8,815,752 B2    8/2014  Olson et al.
(Continued)

FOREIGN PATENT DOCUMENTS

CN        113508373        10/2021

OTHER PUBLICATIONS

"U.S. Appl. No. 16/719,218, Notice of Allowance dated Mar. 12, 2020".
(Continued)

*Primary Examiner* — Hung D Le
(74) *Attorney, Agent, or Firm* — Schwegman Lundberg & Woessner, P.A.

(57) ABSTRACT

A shared database platform can interface with a cluster computing platform over a network through a connector. The data transferred over the network can include metadata result packages that can be distributed to worker nodes of the cluster computing platform, which receive the metadata objects and access the result data for further processing on a staging platform, such as a scalable storage platform.

30 Claims, 8 Drawing Sheets

(51) Int. Cl.
*G06F 16/27* (2019.01)
*H04L 29/06* (2006.01)

(56) References Cited

U.S. PATENT DOCUMENTS

| | | | |
|---|---|---|---|
| 9,753,999 | B2 | 9/2017 | Erdogan et al. |
| 10,210,054 | B1 | 2/2019 | Mehrotra et al. |
| 10,459,908 | B2 | 10/2019 | Varley et al. |
| 10,719,517 | B1 | 7/2020 | Li et al. |
| 2003/0187866 | A1* | 10/2003 | Zelenka ................ G06F 16/289 |
| 2005/0038831 | A1* | 2/2005 | Souder ............... G06F 16/2386 |
| 2005/0120025 | A1 | 6/2005 | Rodriguez et al. |
| 2005/0289175 | A1* | 12/2005 | Krishnaprasad ........ G06F 16/86 |
| 2006/0026219 | A1* | 2/2006 | Orenstein ............... G06F 16/27 |
| 2006/0206505 | A1 | 9/2006 | Hyder et al. |
| 2008/0033897 | A1* | 2/2008 | Lloyd ................... G06F 9/4488 |
| | | | 706/19 |
| 2009/0006888 | A1 | 1/2009 | Bernhard et al. |
| 2009/0012965 | A1* | 1/2009 | Franken ................ G06Q 10/10 |
| 2009/0112796 | A1* | 4/2009 | Elder ...................... F16K 15/16 |
| 2012/0143923 | A1* | 6/2012 | Whitney ............... G06F 16/907 |
| | | | 707/803 |
| 2013/0067024 | A1* | 3/2013 | Vasters ................... G06F 9/542 |
| | | | 709/217 |
| 2014/0304525 | A1* | 10/2014 | Novak .................. G06F 3/0659 |
| | | | 713/193 |
| 2015/0227521 | A1* | 8/2015 | Levari ................... G06F 16/278 |
| | | | 707/694 |
| 2015/0234884 | A1 | 8/2015 | Henriksen |
| 2016/0224581 | A1* | 8/2016 | Barry ...................... G06F 16/13 |
| 2017/0364369 | A1* | 12/2017 | Wells ...................... G06F 9/546 |
| 2018/0113912 | A1* | 4/2018 | Jung ..................... G06F 16/907 |
| 2019/0073378 | A1* | 3/2019 | Guturi ..................... G06F 16/13 |
| 2019/0141018 | A1 | 5/2019 | Hogan et al. |
| 2020/0034373 | A1* | 1/2020 | Lee ........................... G06F 1/14 |

OTHER PUBLICATIONS

"International Application Serial No. PCT/US2020/063794, International Search Report dated Jan. 28, 2021", 3 pgs.
"International Application Serial No. PCT/US2020/063794, Written Opinion dated Jan. 28, 2021", 3 pgs.
U.S. Appl. No. 16/719,218 U.S. Pat. No. 10,719,517, filed Dec. 18, 2019, Distributed Metadata-Based Cluster Computing.

* cited by examiner

DISTRIBUTED METADATA-BASED CLUSTER COMPUTING

CROSS-REFERENCE TO PRIORITY APPLICATION

This application is a Continuation of U.S. patent application Ser. No. 16/719,218, filed on Dec. 18, 2019, the contents of which are incorporated herein in their entirety.

TECHNICAL FIELD

The present disclosure generally relates to special-purpose machines that manage databases and improvements to such variants, and to the technologies by which such special-purpose machines become improved compared to other special-purpose machines for performing distributed computing using database data.

BACKGROUND

Distributed processing can be used to create analytical compute sources to analyze data. Some of these distributed computing systems include a cluster of nodes including a master node and multiple worker nodes that function in concert per the master node's instructions to complete data processing tasks. While these distributed systems enable powerful computing, inefficiencies such as bottlenecks can still occur.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
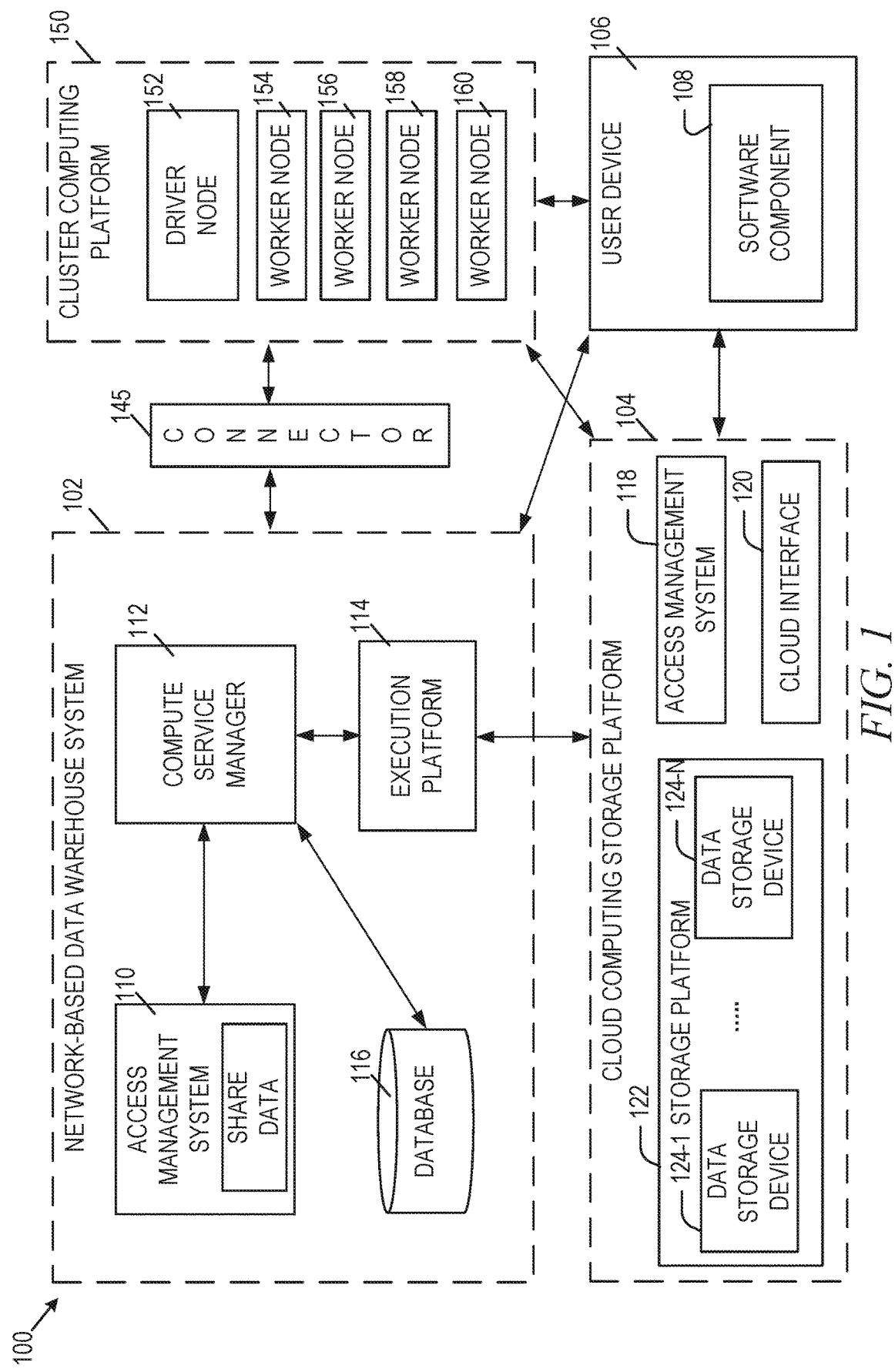
FIG. 1 illustrates an example computing environment in which a network-based data warehouse system can implement cluster computing using a metadata connector, in accordance with some embodiments of the present disclosure.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail As discussed, inefficiencies in distributed computing systems can occur. One type of inefficiency includes a master node bottleneck in accessing and distributing data for computation. For example, if the cluster computing system's data source generates a very large set of result data for processing (e.g., query result data), the master node can be put under a heavy load when it attempts to access and distribute the very large result set to the worker nodes for processing.

To this end, a metadata connector system can be implemented to connect a shared database system with a cluster computing system where a query is executed directly against the shared database processing system and the nodes of the cluster access the query result data on cloud storage directly, without having to connect to the shared database system. In some example embodiments, a query from the cluster computing system (e.g., Apache Spark) uses a shared multitenant database processing system (e.g., Snowflake®) as a data source, where the connection between the two is implemented using an application programming interface (API) connector configured for database access (e.g., Java Database Connectivity (JDBC®)). In some example embodiments, the cluster computing system issues a query through the API connector to the shared database system, which generates query result data that is written to a staging area as files. For example, the shared database system can store the query result data to an external stage such as Amazon S3 buckets using COPY UNLOAD SQL statements, where COPY copies query result data from the database system and UNLOAD transfers the data to the staging area as files. According to some example embodiments, the master node then accesses the staging area (e.g., accesses the S3 buckets) to determine what is in the result files for distribution of the files to the worker nodes for further processing.

If the result files written to the staging area are very large (e.g., terabytes in size), the operations of the master node accessing the result files and/or transferring them to the worker nodes can cause significant delays. To mitigate overloading the master node of the cluster computing system, the API connector (e.g., JDBC) executes the query directly against the shared database system without using the COPY UNLOAD statements (e.g., SELECT statement against the shared database system) and stores the result files in the staging platform. The shared database system then sends some of the result file data to the API connector to generate an object metadata set comprising a plurality of cluster serial objects describing the remaining bulk of the result files in the staging area. For example, if the result files are written as chunks to S3, the shared database system sends, to the API connector, the first chunk of the result files (e.g., when the first chunk is generally small in size), and metadata of the other chunks (e.g., metadata including result chunk files URLs on S3, chunk sizes, credential data to access the result files on S3). The API connector then sends a list of the cluster storage objects to the master node of the cluster computing system, which can then distribute the list of cluster storage objects to the worker nodes.

Worker nodes receive the cluster storage objects and perform a function call to the API connector to retrieve the result file data directly from the staging area (via the API connector). In this way, the API connector does not read the actual result file data (the API connector only handles it as a wrapped metadata, or an envelope/list of objects), and the master node does not need to access and distribute actual result file data but only distributes storage object metadata that describes the result files, where the storage object metadata functions as an envelope and the objects are serialized and thereby can be distributed to worker nodes and concurrently executed and processed by any of the worker nodes, as discussed in further detail below. In this way, even when the query result data set generated by the shared database is huge, the metadata is small and serialized as objects, so the workload distribution and application responsiveness is significantly improved.

One benefit of the connector approach, in addition to significantly lightening the load on the master node, and thereby avoiding a significant bottleneck, includes reducing the network traffic of the result files transferred over the network by half or more. In other approaches, the master node receives the result data and then transfers the result data to the worker nodes. In the metadata connector approach, the data is only transmitted from the shared database system to the staging area, and the master node and API connector only transfer distributable metadata that is significantly smaller than the result files' sizes. Additionally, the metadata connector approach enables the amount of data to be handled to scale considerably in response to increased loads, by increasing the quantity of nodes in the staging area. For instance, where the staging platform is an elastic scalable system such as Amazon S3, the amount of nodes in the staging platform can be increased to better serve requests from the worker nodes (e.g., as the number of worker nodes increases and/or result file size increases, correspondingly increase an amount of staging platform nodes to respond to the worker nodes), which avoids bottlenecking the data through the master node and avoids overloading a static amount of nodes in the staging area.

FIG. 1 illustrates an example shared data processing platform 100 in which a network-based data warehouse system 102 functions as a data source for a cluster computing platform 150 connected by way of a database connector interface, such as a API connector 145, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service such as S3, Microsoft Azure®, or Google Cloud Services), and a user device 106. The network-based data warehouse system 102 is a network-based system used for storing and accessing data (e.g., internally storing data, accessing external remotely located data) in a multitenant integrated manner, and reporting and analysis of the integrated data from the one or more disparate sources (e.g., the cloud computing storage platform 104), where additional analytical computing can be performed by the cluster computing platform 150. The cloud computing storage platform 104 comprises a plurality of computing machines and provides on-demand computer system resources such as data storage and computing power to the network-based data warehouse system 102.

The user device 106 (e.g., a user device such as a laptop computer) comprises one or more computing machines (e.g., a client device such as a laptop computer) that execute a software component 108 (e.g., browser accessed cloud service, native app such as a mobile app for a mobile operating system) to provide additional functionality to users of the network-based data warehouse system 102.

The software component 108 comprises a set of machine-readable instructions (e.g., code) that, when executed by the user device 106, cause the user device 106 to provide certain functionality. The software component 108 may operate on input data and generates result data based on processing, analyzing, or otherwise transforming the input data. As an example, the software component 108 can be a browser that accesses a cloud run customer application on the cluster computing platform 150 for computation by the master node 152 and worker nodes 154-160, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters) in the execution platform 114. The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of the data managed by the shared data processing platform 100. The database 116 stores data pertaining to various functions and aspects associated with the network-based data warehouse system 102 and its users. For example, data against which queries can be executed by a customer application running on cluster computing platform 150 can be stored in database 116 as internal data or in the storage platform 122 as external data.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. Although two data storage devices 124-1 and 124-n are shown in FIG. 1, execution platform 114 is capable of communicating with any number of data storage devices as part of an elastic storage system. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a cloud interface 120 (e.g., API gateway for cloud computing storage platform 104). As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The cloud interface 120 handles tasks involved in accepting and processing concurrent API calls, including traffic management, authorization and access control, monitoring, and API version management. The cloud interface 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner (e.g., cloud computing storage platform 104 is an external network platform, such as Amazon AWS, separately managed but linked to network-based data warehouse system 102). This architecture supports dynamic changes to the network-based data warehouse system 102 based on the changing data storage/retrieval needs as well as the changing needs of the users and systems accessing the shared data processing platform 100. The support of dynamic changes allows the network-based data warehouse system 102 to scale quickly in response to changing demands on the systems and components within the network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

The cluster computing platform 150 is a cluster computing environment that can extend the computing analysis of the network-based data warehouse system 102. For example, whereas the network-based data warehouse system 102 can be configured to function with the cloud computing storage platform 104 to enable a decoupled data warehouse that can scale, the cluster computing platform 150 can be a big data or no-SQL platform (e.g., Apache Spark, Hadoop, Cassandra) that implements a master node 152 and a plurality of worker nodes 154 to perform distributed computing tasks (e.g., data analysis). In some example embodiments, the network-based data warehouse system 102 and the cloud computing storage platform 104 function as a single entity, and the cluster computing platform 150 is agnostic to the decoupling and functions of the single entity. For instance, the network-based data warehouse system 102 and the cloud computing storage platform 104 can be implemented as a Snowflake data source to an Apache Spark Cluster (e.g., an example embodiment of the cluster computing platform 150), where the two platforms are connected via API connector 145 such as JDBC. Although the API connector 145 is shown between the network-based data warehouse system 102 and the cluster computing platform 150, it is appreciated that the API connector 145 can be integrated within the network-based data warehouse system 102, as discussed in further detail below with reference to FIG. 2.

Further, compute service manager 112, database 116, execution platform 114, cloud computing storage platform 104, cluster computing platform 150, and user device 106 are shown in FIG. 1 as individual components. However, each of compute service manager 112, database 116, execution platform 114, cloud computing storage platform 104, and cluster computing platform 150 may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries from cluster computing platform 150) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, may be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
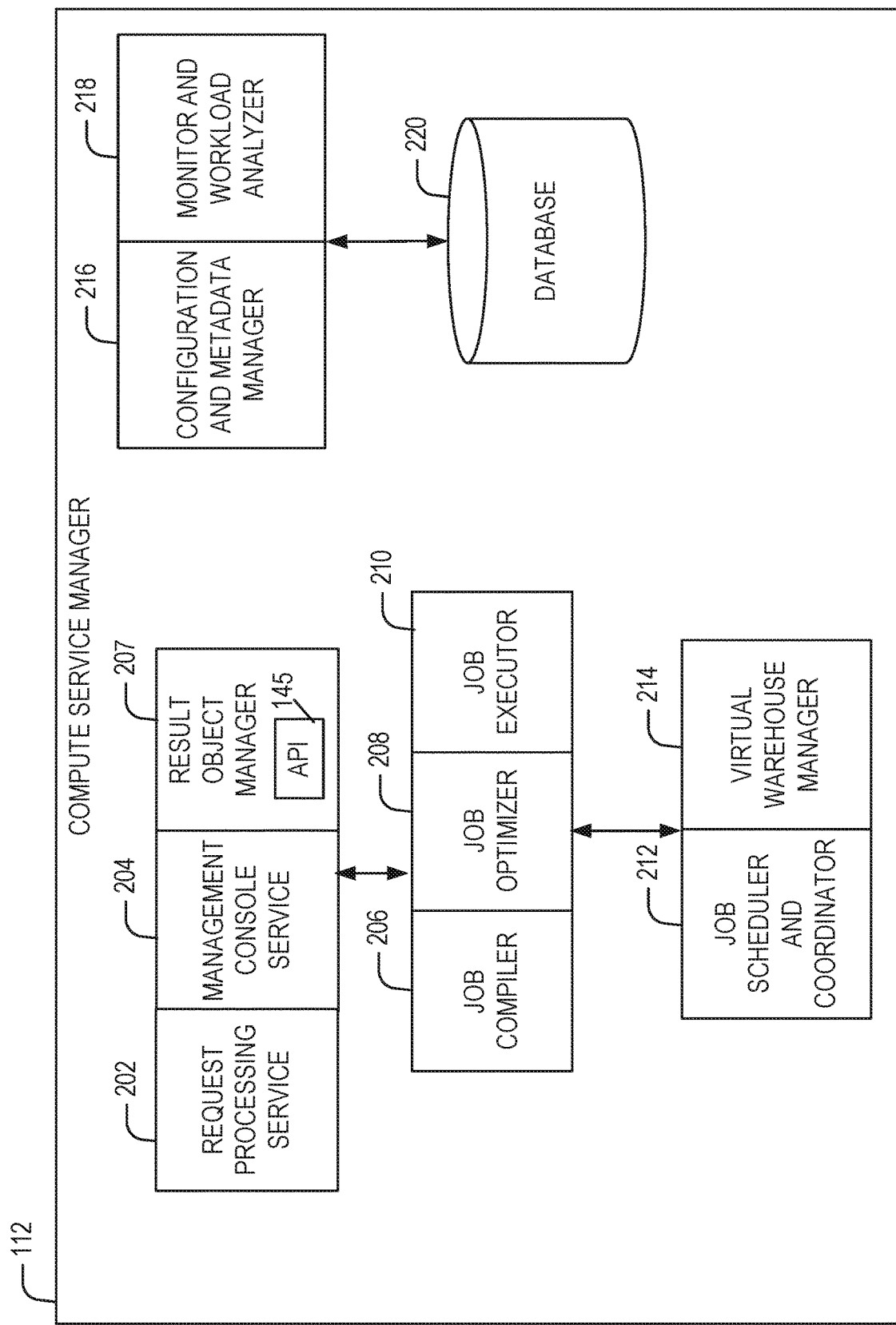
FIG. 2 is a block diagram illustrating components of a compute service manager, in accordance with some embodiments of the present disclosure.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The result object manager 207 is configured to generate serialized result files for storage on a staging platform and generate the object metadata set which is a metadata list describing the result files stored in the staging platform. The result object manager 207 includes the API connector 145 as a relational database connection interface for facilitating data transfers (e.g., receiving queries and transmitting result data) between the network-based data warehouse system 102 and the cluster computing platform 150. For example, a customer application running on cluster computing platform 150 can issue a query to the network-based data warehouse system 102, which is directed towards to the API connector 145 for parsing and forwarding as a job request to the request processing service. Although the API connector 145 is illustrated as between the cluster computing platform 150 and the network-based data warehouse system 102, in some example embodiments the API connector 145 is installed in the network-based data warehouse system 102 to send and receive data to the cluster computing platform 150, which may be an externally run cluster computing platform 150 managed by a different company (e.g., cluster computing platform 150 can be an Apache Spark cluster hosted by the Databricks platform or other Spark platforms).

The compute service manager 112 also includes a job compiler 206, a job optimizer 208 and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversee processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represents any data storage device within the network-based data warehouse system 102. For example, data storage device 220 may represent caches in execution platform 114, storage devices in cloud computing storage platform 104, or any other storage device.

Figure 3:
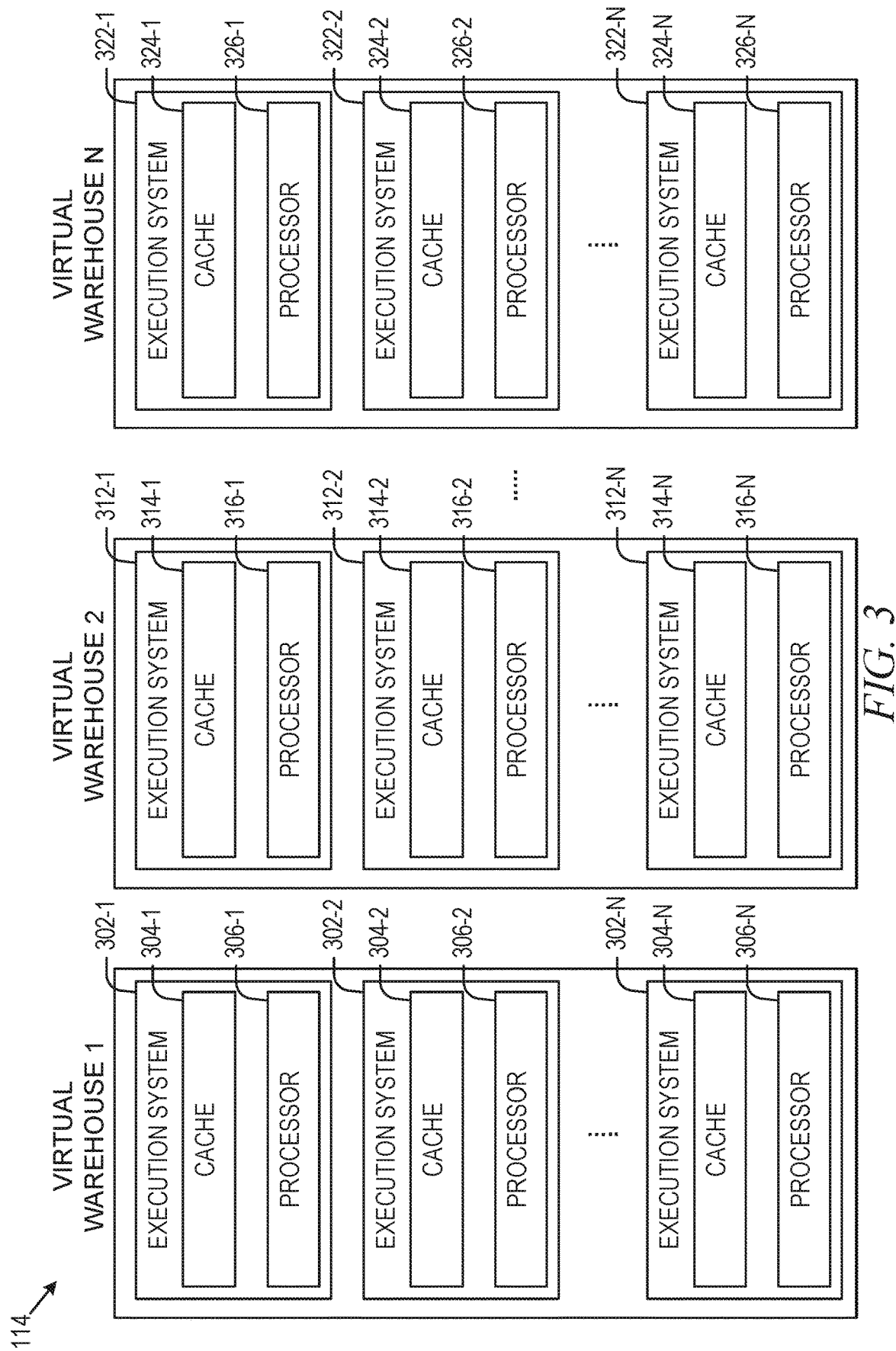
FIG. 3 is a block diagram illustrating components of an execution platform, in accordance with some embodiments of the present disclosure.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 duster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real-time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the another user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or storage platform 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
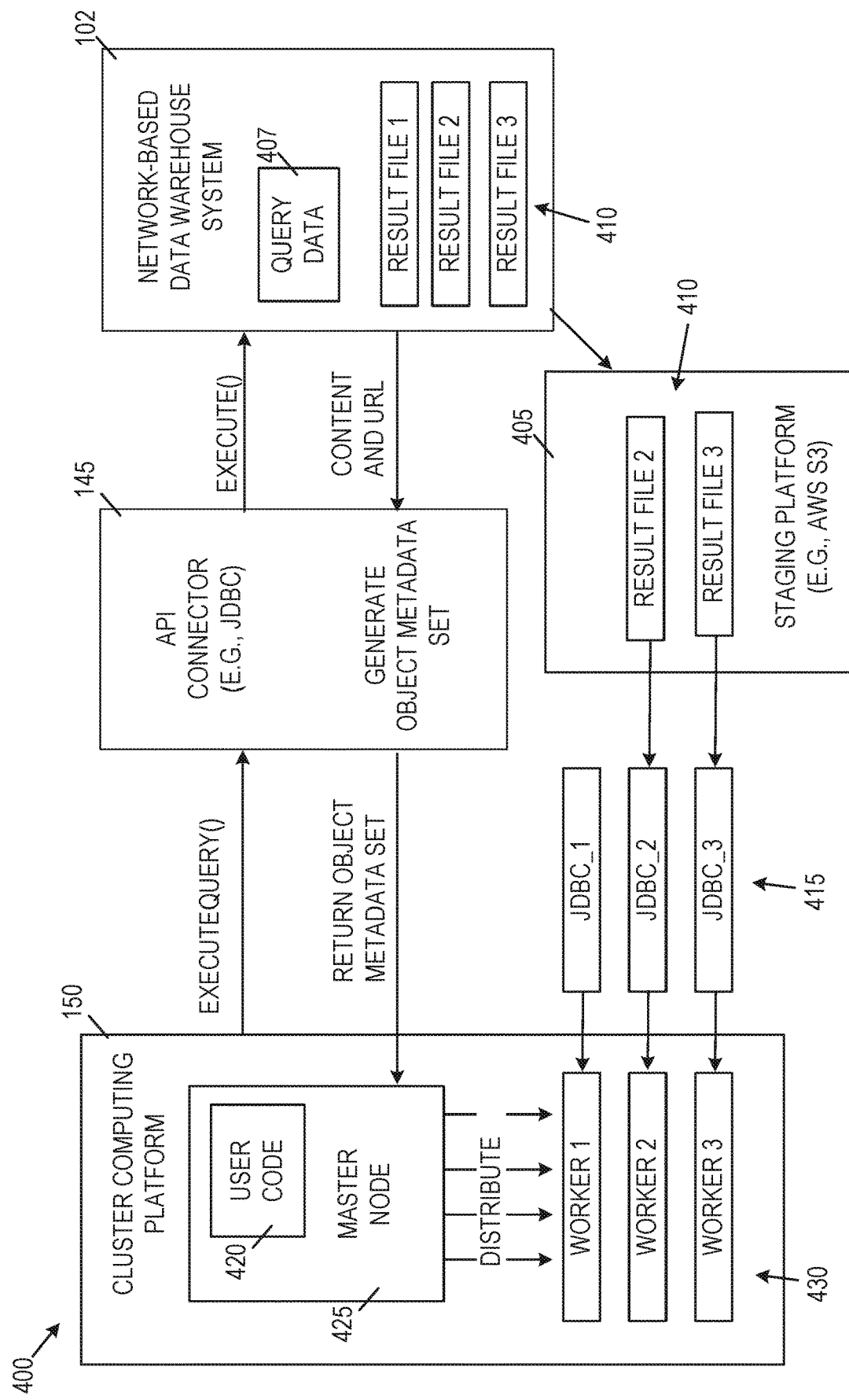
FIG. 4 shows an example data architecture for duster computing using a metadata connector, in accordance with some embodiments of the present disclosure.

FIG. 4 shows an example metadata connector architecture 400 for distributed cluster computing, according to some example embodiments. In the example illustrated in FIG. 4, the cluster computing platform 150 comprises user code 420 (e.g., end-user code, queries, a Spark application, etc.) that processes data in a cluster approach using master node 425 (e.g., a driver node) and a plurality of worker nodes 430. The cluster computing platform 150 is configured to use the network-based data warehouse system 102 as a relational data source via the API connector 145 (e.g., a JDBC connector). In the example, the user code 420 includes a query in the format for the API connector 145 (e.g., "ExecuteQuery") which then executes the query against the network-based data warehouse system 102 in the query format for the network-based data warehouse system 102 (e.g., "execute"). The network-based data warehouse system 102 implements one or more virtual warehouses and storage devices in a decoupled scalable approach as discussed above with reference to FIG. 1-3 to generate query data 407 (e.g., query results), which are used to generate result files 410.

In some example embodiments the result files 410 are serialized objects using a serialization interface (e.g., Java serialization, result files 1, 2, 3, ..., n, a serialized file in JSON, which can be decompressed on workers). For example, the network-based data warehouse system 102 implements Java serialization interface in construction the objects (e.g., import.java.io.serializable to serialize using ObjectOutputStream class using the writeObject( ) method).

The serialization of the objects stores the object state to a sequence of bytes and stores the process of rebuilding to bytes into a processable object that can be processed at a later time (e.g., rebuilding and processing on a given worker node). In some example embodiments, the query data 407 is returned as JSON data, which is then used to create a serialized object, where the schema and variable values are persisted in the serialization interface to allow the result files to be compressed as serialized objects for storage on S3, then distributed to the worker nodes by worker node requests, and then decompressed (e.g., deserialized, restored) for each worker node. In some example embodiments, the serialization variables for which state is stored include: column names from tables that are queried, indices where what data is serialized or persisted can change based on the data being queried (e.g., data in the network-based data warehouse system 102, schema, table amount, type of data, etc., that is being queried by cluster computing platform 150). The size of the objects serialized and stored to a staging platform 405 can vary according to implementation (e.g., set up a large file size to reduce an amount of result files, or set up small file size to increase file amount but rely on additional worker nodes to increase distributed performance. Although JSON is discussed in the examples here, it is appreciated that the objects can be constructed and serialized in Arrow format and additional binary formats.

The network-based data warehouse system 102 then stores the result files 410 to a staging platform 405. The staging platform 405 can be a cloud storage database (e.g., S3) that is elastic and can scale to handle large amounts of result files and connections from the cluster computing platform 150 (e.g., worker node requests).

As discussed, if the master node 425 accesses the result files 410 in the staging platform 405 (e.g., to retrieve it and determine a plan for distributed the data to workers) a bottleneck can occur as the size of the result files increases. To avoid bottlenecks and to enable scalability, the snowflake platform constructs an object metadata set (e.g., wrapper, envelope) that describes the data in the platform 405 and transmits the object metadata set to the API connector 145 to send to the duster computing platform 150. For example, and in accordance with some example embodiments, the network-based data warehouse system 102 includes in the object metadata set: the first chunk (the actual result file object), and file URLs, row counts, compressed/uncompressed sizes, and credential data for the other chunks of the result files 410 still in the staging platform 405.

The API connector 145 receives the object metadata set, does not read or need to modify it, and sends it to the cluster computing platform 150, e.g., to the master node 425. In this way, even if the amount of result files is extremely large, the object metadata set describing the result files is still small and easy to process and send. Continuing, the master node 425 then distributes the individual objects in the object metadata set to the worker nodes using distribution and optimizations native to the cluster computing platform 150. For example, if the cluster computing platform 150 is Apache Spark, then the master node 425 distributes the objects to the worker nodes 430 as RDDs, where distribution of RDDs and ordering is handled by the native optimizations internal to Apache Spark. It is appreciated that although Apache Spark is used here as an example, the cluster computing platform 150 can be other cluster mode platforms such as Cassandra or Hadoop. In these example implementations, the cluster systems can still easily receive and distribute the objects for computation. For example, the cluster computing platform 150 can be Hadoop and can efficiently distribute the serializable storage objects to nodes, which can then rapidly access the data on the stating platform 405, decompress it, and perform further actions per the Hadoop application (e.g., MapReduce operations) in a similar manner.

Continuing, the worker nodes 430 receive the objects and then use the connector function call 415 to retrieve the result files assigned to respective workers from the staging platform 405. For example, as illustrated, worker 2 calls the function "getResultSet( )" to the connector JDBC_2 to get a standard JDBC ResultSet object comprising result file 2 on the staging platform 405, where the returned data is decompressed (e.g., JSON deserializer). The getResultSet( ) function is mapped to the standard getResult( ) call native to JDBC in the API connector 145 (e.g., the connector code is extended or modified to store the mapping), according to some example embodiments. Similarly, worker 3 calls the function "getResultSet" to the connector JDBC_3 to get a standard JDBC ResultSet object comprising result file 3 on the staging platform 405, and additional worker nodes can likewise access result set data of additional result files (e.g., worker node n using JDBC_n to receive ResultSet n). In the illustrated example, the first worker node does not access the first chunk (e.g., result file 1) as that file was included in the object metadata set (e.g., where the result file 1 or first chunk of a Result Set is typically small, it is included in the metadata objects sent via the API connector 145). Further, according to some example embodiments, the connector function call 415 are calls to the API connector 145, while in other example embodiments, each of the JDBC_1, JDBC_2, JDBC_3, JDBC_n, etc., are separate instances of an individual API connector installed for each worker node. Continuing, once the worker nodes 430 download their assigned respective portions of the result data via HTTP URL and decompress it, each worker node then can perform analysis and further per the user code 420 (e.g., further processing, queries, filtering generating visualizations, and other actions instructed by an end-user).

In some example embodiments, the result files 410 are stored as objects in the staging platform 405 for a preconfigured time period to enable rapid reprocessing of the queried data by the worker nodes at a later time. For example, the result files 410 for a given query are stored on the staging platform 405 for 36 hours (e.g., a session) to enable the workers to rapidly reprocess and deserialize the queried data without creating new result files and defining new serializations. Further, according to some example embodiments, the credentials used by the workers (e.g., received from the envelope) expire to increase security (e.g., worker 2's credentials to access result file 2 on staging platform 405 expires within 6 hours).

Figure 5:
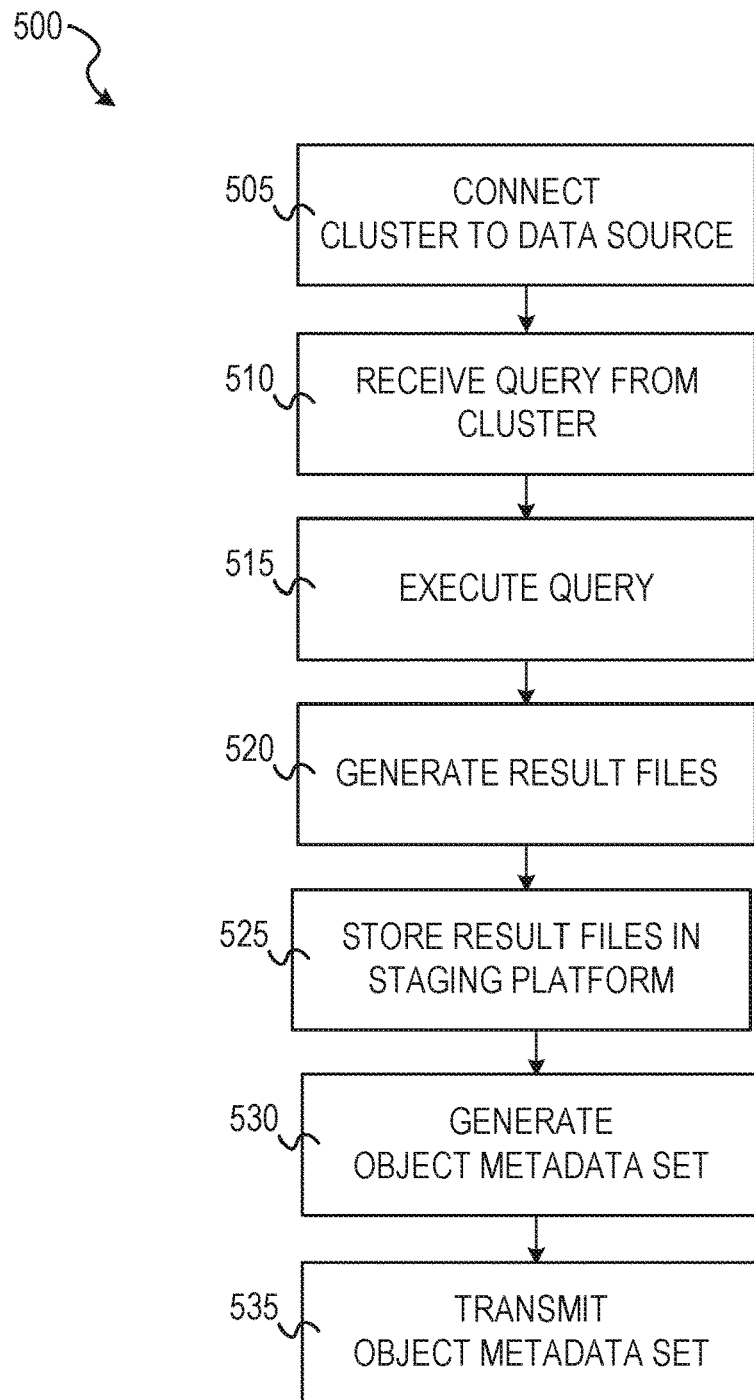
FIGS. 5 and 6 show example flow diagrams for implementing cluster computing using a metadata connector, in accordance with some embodiments of the present disclosure.

FIG. 5 flow diagram of a method 500 for generating result files and object metadata set items for cluster computing processing, according to some example embodiments. At operation 505, the computing cluster connects to a data source against which the computing cluster can execute queries. For example, at operation 505, master node of the cluster computing platform 150 is connected to the network-based data warehouse system 102 via an API connector, such as API connector 145.

At operation 510, the network-based data warehouse system 102 receives a query from the cluster. For example, at operation 510, a customer application on the cluster computing platform 150 executes a query which is transmitted through the API connector 145 to the network-based data warehouse system 102 for processing against databases managed by the network-based data warehouse system 102.

At operation 515, the network-based data warehouse system 102 executes the query. For example, the network-based data warehouse system 102 executes the query against data managed by the shared data processing platform 100 using the virtual warehouses discussed with reference to FIGS. 1-3 above.

At operation 520, the network-based data warehouse system 102 generates result files from the query data. As discussed, the result files are serializable through API connector 145 (e.g., java.io.serializable), and can be transferred to different systems for remote processing such as the cluster computing platform worker nodes. At operation 525, the network-based data warehouse system 102 stores the generated result files. For example, at operation 525, the network-based data warehouse system 102 stores the result files in the cloud-based staging platform, such as Amazon S3 or Microsoft Azure.

At operation 530, the network-based data warehouse system 102 generates an object metadata set that describes the serialized data stored on the staging platform. As discussed above, the object metadata set can include first result file or chunk data, and metadata describing the result files that are stored in the staging platform, including result file sizes, file formats, credential or access information, file paths (e.g. network addresses, URLs), for each of the result files on the staging platform.

At operation 535, the network-based warehouse system transmits the object metadata set. For example, at operation 535, the network-based data warehouse system 102 transmits the object metadata set to the cluster computing platform 150 via the API connector 145 for distribution to the worker nodes and further processing.

Figure 6:
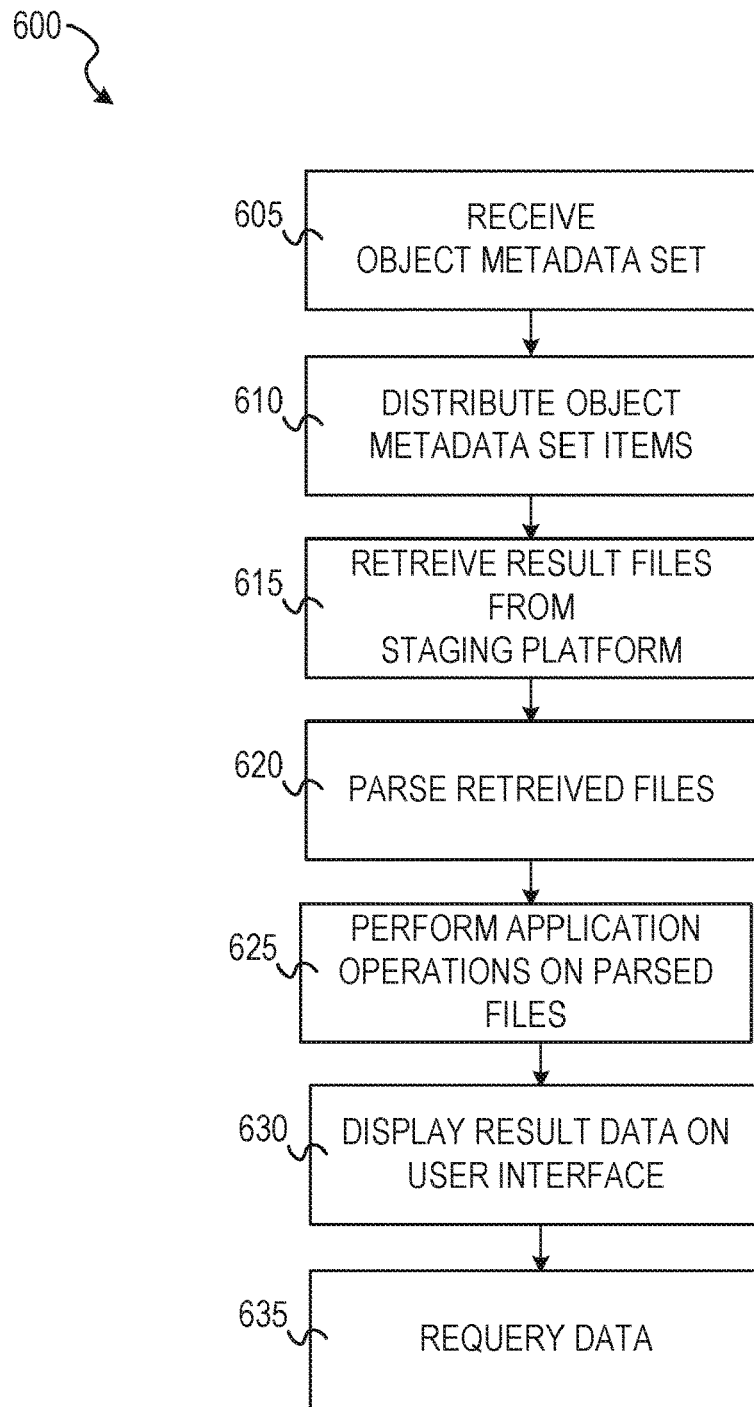

FIG. 6 shows the flow diagram of a method 600 for processing result files received from the API connector, according to some example embodiments. At operation 605 the duster computing platform 150 receives the object metadata set. For example, at operation 605, the master node of the cluster computing platform 150 receives the object metadata set from the API connector 145. At operation 610, the cluster computing platform 150 distributes object metadata set items. For example, at operation 610, the master node of cluster computing platform 150 distributes the object metadata set amongst its worker nodes, e.g., one metadata item per worker node, where each of the metadata objects enables the recipient worker node to retrieve one of the result files on the staging platform for processing.

At operation 615, the cluster computing platform 150 retrieves result files from the staging platform. For example, at operation 615, the worker nodes of the cluster computing platform 150 perform a function call to the API connector 145 (e.g., GetResult( )) to directly access and download result files from the staging platform. The API connector 145 receives the function call from a given worker node, and returns result data, such as a ResultSet in JDBC, that contains the result files in the staging platform assigned to the given node.

An operation 620, the cluster computing platform 150 parses the retrieved result files. For example, at operation 620, each of the workers downloads the storage object result file from the staging platform, decompresses it (e.g., deserializes it using a JSON serializer), and stores the result data in uncompressed form for processing.

At operation 625, the cluster computing platform 150 performs application operations on the retrieved result files. For example, at operation 625, each of the worker nodes in the cluster computing platform 150 performs additional analytical operations (e.g., data science operations, visualization generation operations, internal query and data arrangement operations) using the native functionality or instructions of the cluster computing platform 150 (e.g., Apache spark standard functions, Spark machine learning libraries).

At operation 630, the cluster computing platform 150 displays processed result data on a user interface. For example, at operation 630 the customer application on the cluster computing platform 150 displays the data visualization or query results on a user interface of a user device, such as user device 106. At operation 635, the data is result data is re-queried. For example, as discussed above, the staging platform can retain the result file objects for a limited time (e.g., 36 hours) during which time the objects and serialization process for a given set of data do not need to be reprocessed. Rather, the data remains on the staging platform, and the duster computing platform 150 can query data using the distributed serialization approach. According to some example embodiments, after the retention period expires, the serialized result objects are deleted or otherwise removed from the staging platform.

Figure 7:
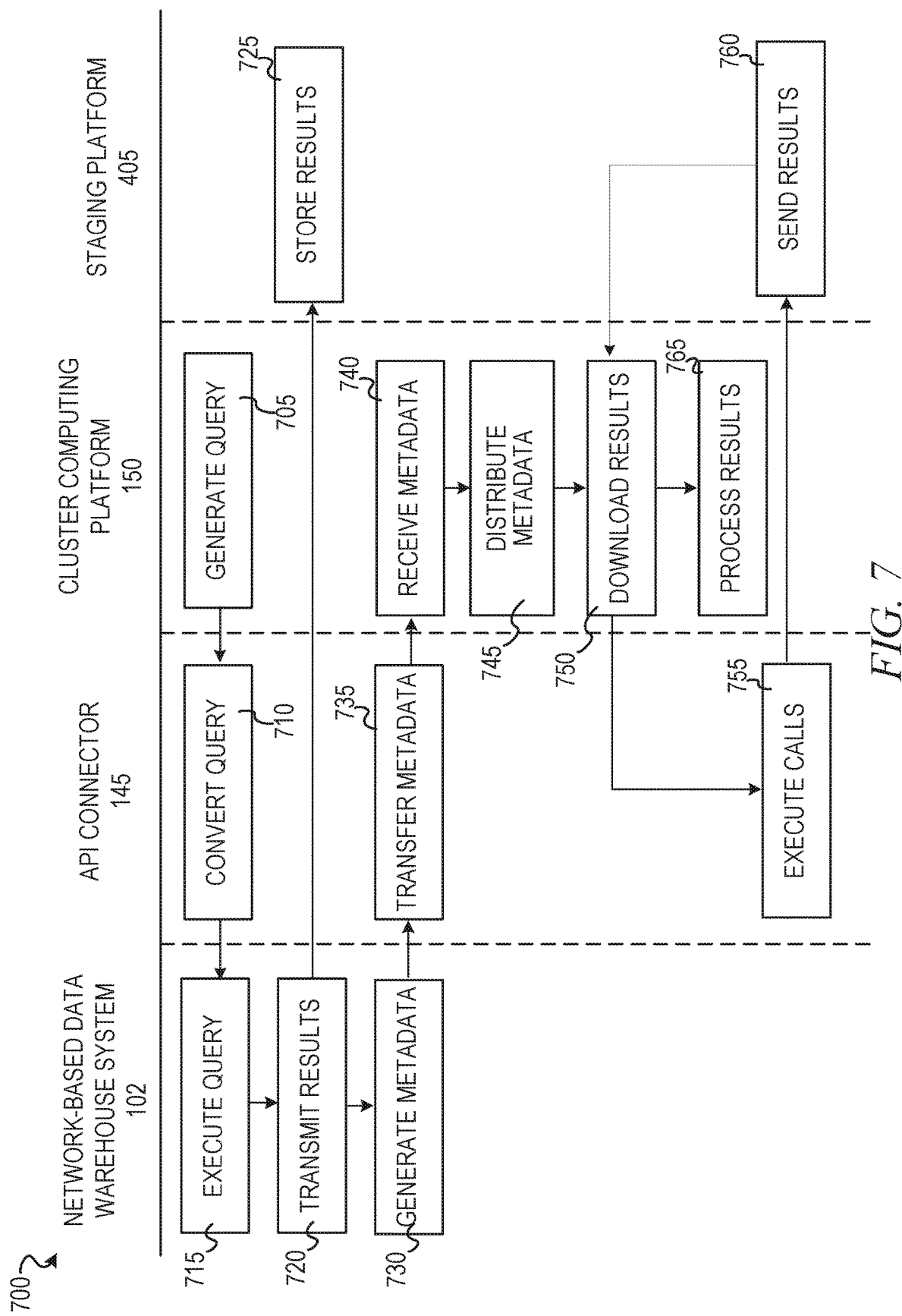
FIG. 7 shows an example network lane diagram for implementing cluster computing using a metadata connector, in accordance with some embodiments of the present disclosure.

FIG. 7 shows a network lane diagram 700 for implementing cluster computing using a metadata connector, according to some example embodiments. In the network lane diagram 700, each of the columns or lanes corresponds to actions performed by the different entities of their respective lanes. For example, in the first column, operations 715, 720, and 730 are performed by the network-based data warehouse system 102. Similarly, the API connector 145 performs operations 710, 735, and 755; the cluster computing platform 150 performs operations 705, 740, 745, 750, and 765; and the staging platform 405 performs operations 725 and 760, according to some example environments. It is appreciated that although the entities are discussed and shown as separate entities in the example of FIG. 7, the entities may be combined or integrated as it is appreciated by those having ordinary skilled in the art. For example, the API connector 145 may be installed as a component of the network-based data warehouse system 102.

At operation 705, the cluster computing platform 150 generates a query. For example, a Spark user creates or develops an Apache Spark job (e.g., customer application) where the job is managed by the cluster computing platform 150, e.g., the master node receives the job and generates the query for data, where the data is managed by the network-based data warehouse system 102. At operation 710, the API connector 145 converts the query for execution against the network-based data warehouse system 102. At operation 715, the network-based data warehouse system 102 executes the received query against one or more relational data stores to generate query result data. At operation 720, the network-based data warehouse system 102 transmits the result files to the staging platform 405, which then stores the result files at operation 725. According to some example embodiments, the network-based data warehouse system 102 serializes the result data results as serializable objects via a connector API (Java serializable interface). At operation 730, the network-based data warehouse system 102 generates metadata (e.g., the object metadata set) that describes the files that are stored in the staging platform 405 (e.g., address, format, location, size) and access data (e.g., network credentials) that the cluster computing platform 150 can implement to access the stored result data. At operation 735, the API connector 145 receives the object metadata set. At operation 745, the master node of the cluster computing platform 150 distributes the metadata objects to each of the worker nodes. At operation 750, each of the worker nodes receives an object metadata item from the list and performs a function call to the API connector 145. At operation 755, the API connector 145 functions as a utility for the worker nodes and executes the calls (e.g., GetResult( ) to return ResultSet for a give node) to access the result files on the staging platform 405. The staging platform 405 then sends the results to the worker nodes at operation 760. At operation 765, the worker nodes of the cluster computing platform 150 processes the downloaded result files. For example, each of the worker nodes downloads a result file in serialized form and decompresses it, and performs further processing on the data according to the customer application (e.g., analytics processing, machine learning methods, etc.).

Figure 8:
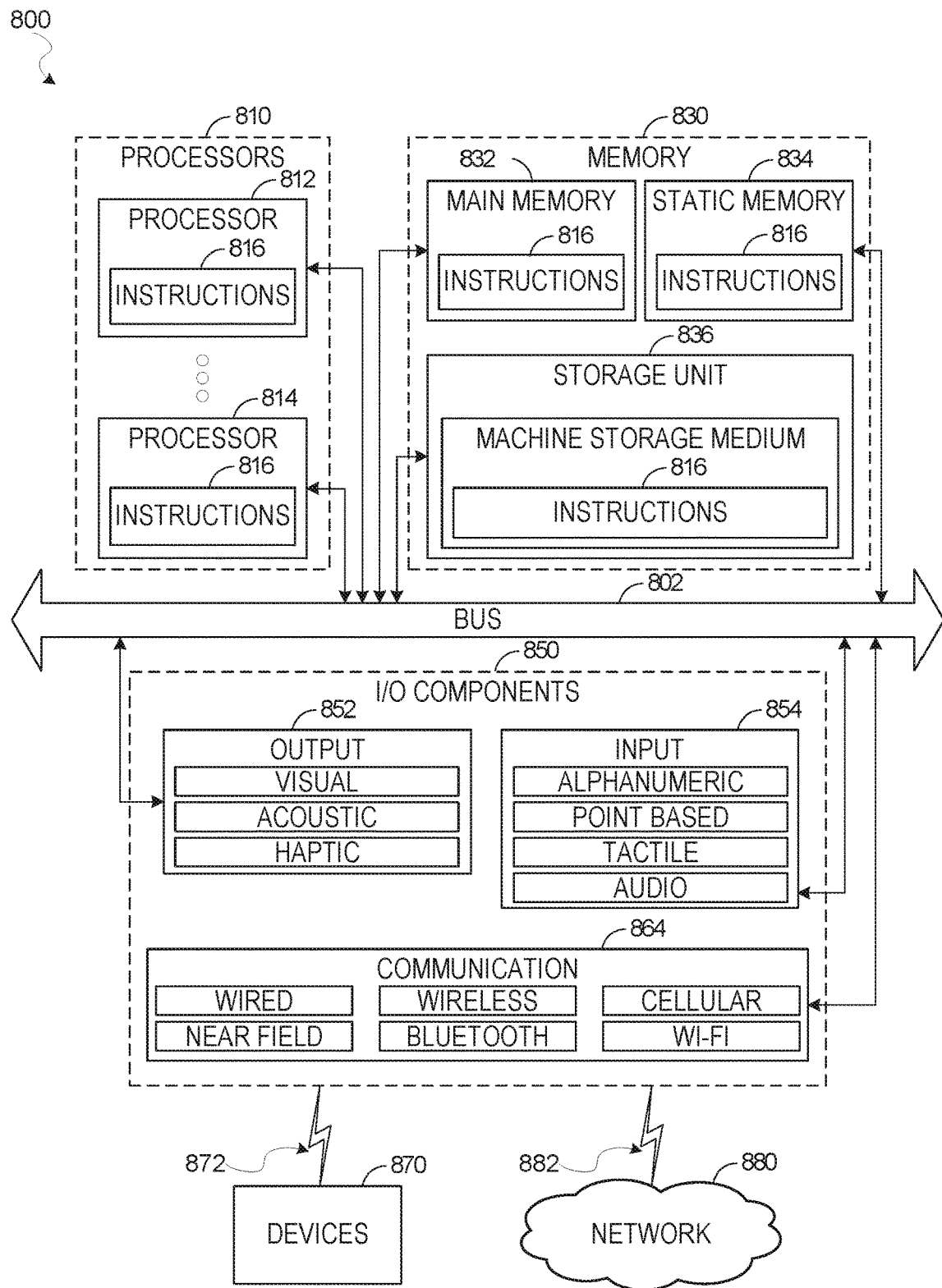
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods 500, 600, and 700. In this way, the instructions 816 transform a general, non-programmed machine into a particular machine 800 (e.g., the user device 106, the access management system 110, the compute service manager 112, the execution platform 114, the access management system 118, the cloud interface 120) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the user device 106, the access management system 110, the compute service manager 112, the execution platform 114, the access management system 118, the cloud interface 120.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 500, 600, and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

EXAMPLES

Example 1 is a method comprising: receiving, by a database connector interface, using one or more processors of a machine, a query against a distributed database, the query received from an external computing cluster comprising a master node and a plurality of worker nodes, the distributed database generating serialized result files for the query and storing the serialized result files in a staging database; transmitting, by the database connector interface, an object metadata set to the master node of the external computing cluster, the object metadata set comprising a plurality of object metadata set items, each of the plurality of object metadata set items describing access data of one of the serialized result files in the staging database; receiving, by the database connector interface, from the plurality of worker nodes, requests for the serialized result files stored in the staging database, each of the requests generated using one of the plurality of object metadata set items; and transmitting, by the database connector interface, the serialized result files from the staging database to the plurality of worker nodes of the external computing cluster, the plurality of worker nodes receiving the serialized result files and performing further processing on the serialized result files.

In Example 2, the subject matter of 1, further optionally comprising, wherein each of the plurality of object metadata set items comprises network address data of one of the serialized result files in the staging database.

In Example 3, the subject matter of any one of examples 1 or 2, further optionally comprising, wherein each of the plurality of object metadata set items comprises credential data to access the serialized result files in the staging database.

In Example 4, the subject matter of any one of examples 1 to 3, further optionally comprising, wherein the plurality of worker nodes receive the plurality of metadata set items from the master node and the plurality of worker nodes generate the requests for the serialized result files using the network address data in the received plurality of metadata set items.

In Example 5, the subject matter of any one of examples 1 to 4, further optionally comprising, generating, by the distributed database, query results using the query received from the external computing cluster.

In Example 6, the subject matter of any one of examples 1 to 5, further optionally comprising, generating the serialized result files using the query results, the serialized result files generated using a serialization interface of the database connector interface, wherein the serialized result files generated using the serialization interface are distributable across a network for remote processing.

In Example 7, the subject matter of any one of examples 1 to 6, further optionally comprising, wherein the serialized result files store state data of the query results using the serialization interface.

In Example 8, the subject matter of any one of examples 1 to 7, further optionally comprising, wherein the state data comprises schema of the query results generated for the query.

In Example 9, the subject matter of any one of examples 1 to 8, further optionally comprising, wherein the further processing performed by the plurality of worker nodes comprises decompressing the serialized result files.

In Example 10, the subject matter of any one of examples 1 to 9, further optionally comprising, wherein the serialized result files are decompressed by deserializing the serialized result files used to restore the state data.

In Example 11, the subject matter of any one of examples 1 to 10, further optionally comprising, wherein the further processing performed by the plurality of worker nodes comprises instructions generated from a cluster computing application hosted by the external computing cluster.

In Example 12, the subject matter of any one of examples 1 to 11, further optionally comprising, wherein the distributed database is a relational database and the database connector interface is a relational database application programming interface (API) connector.

Example 13 is a system comprising: one or more processors of a machine; and a memory storing instructions that, when executed by the one or more processors, cause the machine to perform operations implementing any one of example methods 1 to 12.

Example 14 is a machine-readable storage device embodying instructions that, when executed by a machine, cause the machine to perform operations implementing one of methods 1 to 12.

What is claimed is:

1. A method comprising:
receiving, by a database connector, using one or more processors of a machine, a query against a database, the query received from a computing cluster comprising a plurality of nodes;
generating serialized files from result files generated by the database, the serialized files generated by converting data objects of the result files to data streams;
storing the serialized files in a results data store that is external to the plurality of nodes;
transmitting, by the database connector, a plurality of metadata items to the computing cluster, the plurality of metadata items comprising access data that enables access by the plurality of nodes to the serialized files in the results data store;
distributing, by one of the plurality of nodes, the plurality of metadata items to other nodes of the plurality of nodes to access different portions of the serialized files stored in the results data store that is external to the plurality of nodes;
receiving, by the database connector, from the other nodes, requests for the different portions of the serialized files stored in the result data store, each of the requests generated using one or more of the plurality of metadata items distributed by the one of the plurality of nodes to the other nodes; and transmitting, by the database connector, the serialized files to the other nodes of the computing cluster.

2. The method of claim 1, wherein the other nodes restore the result files generated by the database by converting the data streams of the received serialized files into the data objects of the result files.

3. The method of claim 2, wherein the database connector is integrated in the database, and wherein the method further comprises:
generating, by the database, query results using the query received from the computing cluster.

4. The method of claim 3, further comprising:
generating the serialized files using the query results, the serialized files generated using a serialization interface of the database connector, wherein the serialized files generated using the serialization interface are distributable across a network for further processing.

5. The method of claim 4, wherein the serialized files store state data of the query results using the serialization interface.

6. The method of claim 5, wherein the state data comprises schema of the query results generated for the query.

7. The method of claim 5, wherein the other nodes perform further processing comprising decompressing the serialized files.

8. The method of claim 7, wherein the serialized files are decompressed by deserializing the serialized files used to restore the state data.

9. The method of claim 2, wherein the other nodes perform processing on the restored result files comprising application operations of a cluster computing application input into the computing cluster.

10. The method of claim 1, wherein each of the plurality of metadata items comprises network address data of one of the serialized files in the results data store.

11. The method of claim 10, wherein the other nodes generate requests for serialized files using the network address data in the plurality of metadata items.

12. The method of claim 1, wherein each of the plurality of metadata items comprises credential data to access the serialized files in the results data store.

13. A system comprising:
one or more processors of a machine; and
at least one memory storing instructions that, when executed by the one or more processors, cause the machine to perform operations comprising:
receiving, by a database connector, using one or more processors of a machine, a query against a database, the query received from a computing cluster comprising a plurality of nodes;
generating serialized files from result files generated by the database, the serialized files generated by converting data objects of the result files to data streams;
storing the serialized files in a results data store that is external to the plurality of nodes;
transmitting, by the database connector, a plurality of metadata items to the computing cluster, the plurality of metadata items comprising access data that enables access by the plurality of nodes to the serialized files in the results data store;
distributing, by one of the plurality of nodes, the plurality of metadata items to other nodes of the plurality of nodes to access different portions of the serialized files stored in the results data store that is external to the plurality of nodes;
receiving, by the database connector, from the other nodes, requests for the different portions of the serialized files stored in the result data store, each of the requests generated using one or more of the plurality of metadata items distributed by the one of the plurality of nodes to the other nodes; and
transmitting, by the database connector, the serialized files to the other nodes of the computing cluster.

14. The system of claim 13, wherein the other nodes restore the result files generated by the database by converting the data streams of the received serialized files into the data objects of the result files.

15. The system of claim 14, the operations further comprising:
generating, by the database, query results using the query received from the computing cluster.

16. The system of claim 15, further comprising:
generating the serialized files using the query results, the serialized files generated using a serialization interface of the database, wherein the serialized files generated using the serialization interface are distributable across a network for further processing.

17. The system of claim 16, wherein the serialized files store state data of the query results using the serialization interface.

18. The system of claim 17, wherein the state data comprises schema of the query results generated for the query.

19. The system of claim 18, wherein the other nodes perform further processing on the serialized files comprising:
decompressing the serialized files.

20. The system of claim 19, wherein the serialized files are decompressed by deserializing the serialized files used to restore the state data.

21. The system of claim 14, wherein the other nodes perform processing on the restored result files comprising application operations of a cluster computing application input into the computing cluster.

22. The system of claim 13, wherein each of the plurality of metadata items comprises network address data of one of the serialized files in the results data store.

23. The system of claim 22, wherein the other nodes generate requests for serialized files using the network address data in the plurality of metadata items.

24. The system of claim 13, wherein each of the plurality of metadata items comprises credential data to access the serialized files in the results data store.

25. A machine-readable storage device embodying instructions that, when executed by a machine, cause the machine to perform operations comprising:
receiving, by a database connector, using one or more processors of a machine, a query against a database, the query received from a computing cluster comprising a plurality of nodes;
generating serialized files from result files generated by the database, the serialized files generated by converting data objects of the result files to data streams;
storing the serialized files in a results data store that is external to the plurality of nodes;
transmitting, by the database connector, a plurality of metadata items to the computing cluster, the plurality of metadata items comprising access data that enables access by the plurality of nodes to the serialized files in the results data store;

distributing, by one of the plurality of nodes, the plurality of metadata items to other nodes of the plurality of nodes to access different portions of the serialized files stored in the results data store that is external to the plurality of nodes;

receiving, by the database connector, from the other nodes, requests for the different portions of the serialized files stored in the result data store, each of the requests generated using one or more of the plurality of metadata items distributed by the one of the plurality of nodes to the other nodes; and transmitting, by the database connector, the serialized files to the other nodes of the computing cluster.

26. The machine-readable storage device of claim 25, wherein the other nodes restore the result files generated by the database by converting the data streams of the received serialized files into the data objects of the result files.

27. The machine-readable storage device of claim 26, wherein the other nodes perform processing on the restored result files comprising application operations of a cluster computing application input into the computing cluster.

28. The machine-readable storage device of claim 25, wherein each of the plurality of metadata items comprises network address data of one of the serialized files in the results data store; and wherein the other nodes generate requests for serialized files using the network address data in the plurality of metadata items.

29. The machine-readable storage device of claim 25, wherein each of the plurality of metadata items comprises credential data to access the serialized files in the results data store.

30. The machine-readable storage device of claim 25, the operations further comprising:

generating, by the database, query results using the query received from the computing cluster; and generating the serialized files using the query results, the serialized files generated using a serialization interface of the database connector, wherein the serialized files generated using the serialization interface are distributable across a network for further processing.

* * * * *